UNITED STATES PATENT OFFICE.

WALTER P. JENNEY, OF NEW YORK, N. Y.

IMPROVEMENT IN BASES FOR JAPAN OR VARNISH.

Specification forming part of Letters Patent No. 178,153, dated May 30, 1876; application filed April 3, 1876.

*To all whom it may concern:*

Be it known that I, WALTER P. JENNEY, of the city, county, and State of New York, have invented a new and useful manufacture or resinous compound, suitable for the base of a japan-varnish or waterproofing mixture, and other useful purposes in the arts, which I fully set forth and describe in the following specification, describing the process by which it is produced, its properties, and some of the uses to which it may be applied.

I have discovered that the resinous substances derived from sludge-oil by processes described by me in an application for United States Letters Patent filed by me on or about February 5, 1876, may be combined with raw or vulcanized rubber, in all proportions from one part resin in twenty parts rubber to one part rubber in twenty parts resin, producing a new and useful compound. I make the compound by heating, in an iron still or other suitable vessel, the resin derived from sludge-oil until it is completely melted, and then adding the rubber to it in small pieces, the heat being kept sufficiently high to melt both rubber and resin and thoroughly incorporate them.

The rubber employed may be in the crude raw form, as imported, or rubber after it has been vulcanized may be used; but, on account of cheapness, I prefer to use old scrap-rubber— as worn-out rubber shoes, boots, car-springs, and also old rubber hose, and other similar forms in which rubber is used in the arts.

The scrap-rubber is introduced into the still through a man-hole and stirred into the melted resin. The plate of the man-hole is then put on and the heat raised until a complete solution of the rubber is effected by the hot resin. The man-hole plate is then removed, and any cloth or other similar material contained in the scrap-rubber is drawn out of the still by a rake or other similar means. Other impurities and substances found in scrap-rubber—as lime, white lead, powdered minerals, or dirt— are allowed to settle out by letting the contents of the still remain at rest for some time, the mixture being kept fluid by heat. The new resinous compound is then drawn off from the sediment and cast in any desired form.

The degree of heat necessary to effect the above solution of the rubber in the hot melted resin varies with the degree of vulcanization of the rubber employed. I may define it as between 300° Fahrenheit and 600° Fahrenheit.

The uses to which this new manufacture or resinous substance can be put are various. It may be used as a cement, or employed otherwise in its solid state in the arts.

To produce a japan-varnish, the new resinous substance is dissolved in heavy petroleum-naphtha (about 50° Baumé) or other suitable solvent, and applied in a thin coat to the goods or tin plates, which are subsequently baked in an oven for a number of hours, to render the film of varnish hard and permanent. The temperature of the oven should be kept below 500° Fahrenheit, or the compound undergoes decomposition. To japan in this manner, the compound forming the base of the varnish should contain from ten (10) to forty (40) per cent. of rubber.

For a quick-drying japan-varnish to be used without subsequent baking, the compound is dissolved in light petroleum-naphtha, (about 75° Baumé,) and for this purpose the compound forming the base of the varnish should contain from five (5) to twenty (20) per cent. of rubber.

The following is the receipt which I prefer to use for a japan-varnish: New resinous compound, four (4) pounds; petroleum-naphtha, one (1) gallon; dissolve by warming the resin and adding the naphtha gradually until complete solution is effected.

For the purpose of waterproofing fabrics of cloth or paper, or utensils or vessels made of the same, as paper pails, barrels, &c., the compound employed should contain from ten (10) to fifty (50) per cent. of rubber. The varnish for this purpose is made by dissolving from one (1) to three (3) pounds of the new compound in petroleum-naphtha or other suitable solvent. The thinner the varnish the more it will penetrate the surface of the paper or fabric. A thick varnish remains on the surface after drying, as a shining coat of resin.

For protecting iron and iron manufactures from the weather—as wire cables, iron water-pipes, ornamental castings, &c.—this new compound may be employed dissolved in naphtha, and may, if desired, be colored black by a mixture of lamp-black and Prussian blue, in suitable proportions. In preparing the new resinous substance or compound for this purpose, black and inferior grades of rubber scrap may be used.

Sludge-oil resin may be mixed with fifty (50) to ninety (90) per cent. of hard rubber, as an adulteration, by melting or incorporating them together, and the resulting new compound may be used for the manufacture of hard-rubber goods of various descriptions. For certain purposes the same effect may be produced in part by dissolving the rubber in some suitable solvent, and mixing the resin derived from sludge-oil with it without the aid of heat, thus making a varnish directly from these ingredients without the aid of heat; but I prefer to first dissolve the rubber in hot resin, and then dissolve the resulting new compound in naphtha, oil of turpentine, or other suitable solvents.

Vulcanized rubber will not dissolve to any appreciable extent in petroleum-naphtha; but if it be first melted in hot resin, the new compound is easily dissolved in naphtha.

The character of this new resinous compound or manufacture varies with the proportions of its ingredients. With a large proportion of rubber, as fifty (50) or more per cent., the substance somewhat resembles vulcanized rubber in properties and appearance; but with a small proportion of rubber, as five (5) to ten (10) per cent., the color and appearance of the sludge-oil resin are unchanged, but its adhesiveness and toughness are greatly increased.

Chemically examined, the new substance has the properties of sludge-oil, resin, and also of rubber. It is tasteless, odorless, or with a faint odor of rubber; is not attacked by the alkalies and weaker acids, but is attacked by boiling with strong sulphuric or nitric acids.

The new compound is soluble in those solvents which dissolve both the sludge-oil, resin, and rubber, as petroleum, naphtha, benzole, oil of turpentine, &c.

I do not here claim, broadly, sludge-oil resin dissolved in suitable solvents to produce a varnish, as that forms the subject of another application for Letters Patent filed by me January 6, 1876; but

What I claim as new, and desire to secure by Letters Patent, is—

The new resinous compound or manufacture herein described, and possessing the substantial properties herein described, composed of the resinous substance derived from sludge-oil and rubber incorporated together, substantially as herein set forth and described.

WALTER P. JENNEY.

Witnesses:
PHILLIPS C. ABBOTT,
WM. McINTIRE.